United States Patent
Havener et al.

(10) Patent No.: US 11,828,216 B2
(45) Date of Patent: Nov. 28, 2023

(54) VEHICLE EXHAUST BRACKET

(71) Applicant: FORD GLOBAL TECHNOLOGIES, LLC, Dearborn, MI (US)

(72) Inventors: Kerry Timothy Havener, Canton, MI (US); Shawn D. Norman, Grass Lake, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 147 days.

(21) Appl. No.: 17/396,008

(22) Filed: Aug. 6, 2021

(65) Prior Publication Data
US 2023/0044457 A1 Feb. 9, 2023

(51) Int. Cl.
*F01N 13/18* (2010.01)
*F16F 15/08* (2006.01)
*F01N 1/02* (2006.01)

(52) U.S. Cl.
CPC .......... *F01N 13/1822* (2013.01); *F01N 1/02* (2013.01); *F16F 15/08* (2013.01); *F16F 2230/0005* (2013.01)

(58) Field of Classification Search
CPC .................................................. F01N 13/1822
See application file for complete search history.

(56) References Cited

U.S. PATENT DOCUMENTS

| | | | |
|---|---|---|---|
| 10,519,846 B2 | 12/2019 | Kamiya et al. | |
| 2004/0262460 A1* | 12/2004 | Molnar | F16F 1/3873 248/610 |
| 2012/0023910 A1 | 2/2012 | Parrish et al. | |
| 2012/0181412 A1 | 7/2012 | Rodecker | |
| 2018/0187589 A1* | 7/2018 | Walther | B60K 13/04 |

* cited by examiner

*Primary Examiner* — Anthony Ayala Delgado
(74) *Attorney, Agent, or Firm* — Vincent Mastrogiacomo; Brooks Kushman P.C.

(57) ABSTRACT

A vehicle includes an exhaust, a frame hanger connected to a body of the vehicle, and an isolator connecting the exhaust to a body of the vehicle via the frame hanger such that the exhaust rotates about the frame hanger. The vehicle further includes a first frame bracket having a fixing portion fixed to the body of the vehicle and an engaging portion located near the isolator at a first distance. The first distance defines a first maximum allowable displacement of the exhaust as it rotates in a first direction about the frame hanger. The vehicle may include a second frame bracket having an engaging portion located adjacent to the isolator at a second distance opposite to the first frame bracket. The second distance may define a second maximum allowable displacement of the exhaust as it rotates in a second direction about the frame hanger.

15 Claims, 4 Drawing Sheets

VEHICLE EXHAUST BRACKET

TECHNICAL FIELD

The present disclosure relates to structures that limit displacement of vehicle exhaust systems.

BACKGROUND

Vehicle exhaust systems are connected to the body of a vehicle via one or more isolators made of elastomeric, or rubber-like materials to reduce noise and vibration. Due to the elastomeric nature of the isolator, the exhaust system may have a defined displacement tolerance. However, during some driving conditions, such as water wading, driving over a speed bump, or driving off a curb, a force may be applied to the exhaust system by physical contact (e.g. water, ground, debris) and may move the exhaust system to an unintended position causing it to stay out of the designed position.

SUMMARY

A vehicle includes an exhaust, a frame hanger connected to a body of the vehicle, and an isolator connecting the exhaust to a body of the vehicle via the frame hanger such that the exhaust rotates about the frame hanger. The vehicle further includes a first frame bracket having a fixing portion fixed to the body of the vehicle and an engaging portion located near the isolator at a first distance. The first distance defines a first maximum allowable displacement of the exhaust as it rotates in a first direction about the frame hanger. The vehicle may include a second frame bracket having an engaging portion located adjacent to the isolator at a second distance opposite to the first frame bracket. The second distance may define a second maximum allowable displacement of the exhaust as it rotates in a second direction about the frame hanger. The first distance and the second distance may be equal. The first distance and the second distance may be different. The engaging portion of the first frame bracket may have a shape that is complementary to a portion of the isolator.

An exhaust system connected to a mount of a vehicle via an isolator includes a muffler, an exhaust pipe connected to the muffler; and a first exhaust bracket. The first exhaust bracket has a fixing portion attached to the muffler or the exhaust pipe, and an engaging portion having a shape complementary to a shape of the isolator and that engages with an outer surface of the isolator to limit a travel of the exhaust system relative to the mount. The engaging portion of the first exhaust bracket may be located adjacent to the isolator at a first distance defining a maximum allowable displacement when the exhaust travels in a first direction. The exhaust system may include a second exhaust bracket having a fixing portion attached to the muffler or the exhaust pipe, and an engaging portion that engages with the outer surface of the isolator opposite to the engaging portion of the first exhaust bracket. The engaging portion of the second exhaust bracket may be located adjacent to the isolator at a second distance defining a maximum allowable displacement when the exhaust travels in a second direction. The first distance may be the same as the second distance. The first distance may be different from the second distance.

An isolator for connecting an exhaust system to a mount of vehicle includes an elastomeric body configured to connect to a frame hanger of the vehicle, and a saddle bracket. The saddle bracket has two side walls, a bridging wall connecting the two side walls, and an isolator bracket extending from the bridging wall that engages with the frame hanger when the exhaust system is displaced to limit a travel of the exhaust system relative to the frame hanger. The isolator bracket may include a first pin located on a first side of the frame hanger at a first distance defining a first maximum allowable displacement when the exhaust system is displaced in a first direction, and a second pin located on a second side of the frame hanger opposite to the first side at a second distance defining a second maximum allowable displacement when the exhaust system is displaced in a second direction opposite to the first direction. The first and second distances may be equal. The first and second distances may be different.

DETAILED DESCRIPTION

Embodiments are described herein. It is to be understood, however, that the disclosed embodiments are merely examples and other embodiments may take various and alternative forms. The figures are not necessarily to scale. Some features could be exaggerated or minimized to show details of particular components. Therefore, specific structural and functional details disclosed herein are not to be interpreted as limiting, but merely as a representative basis for teaching one skilled in the art.

Various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
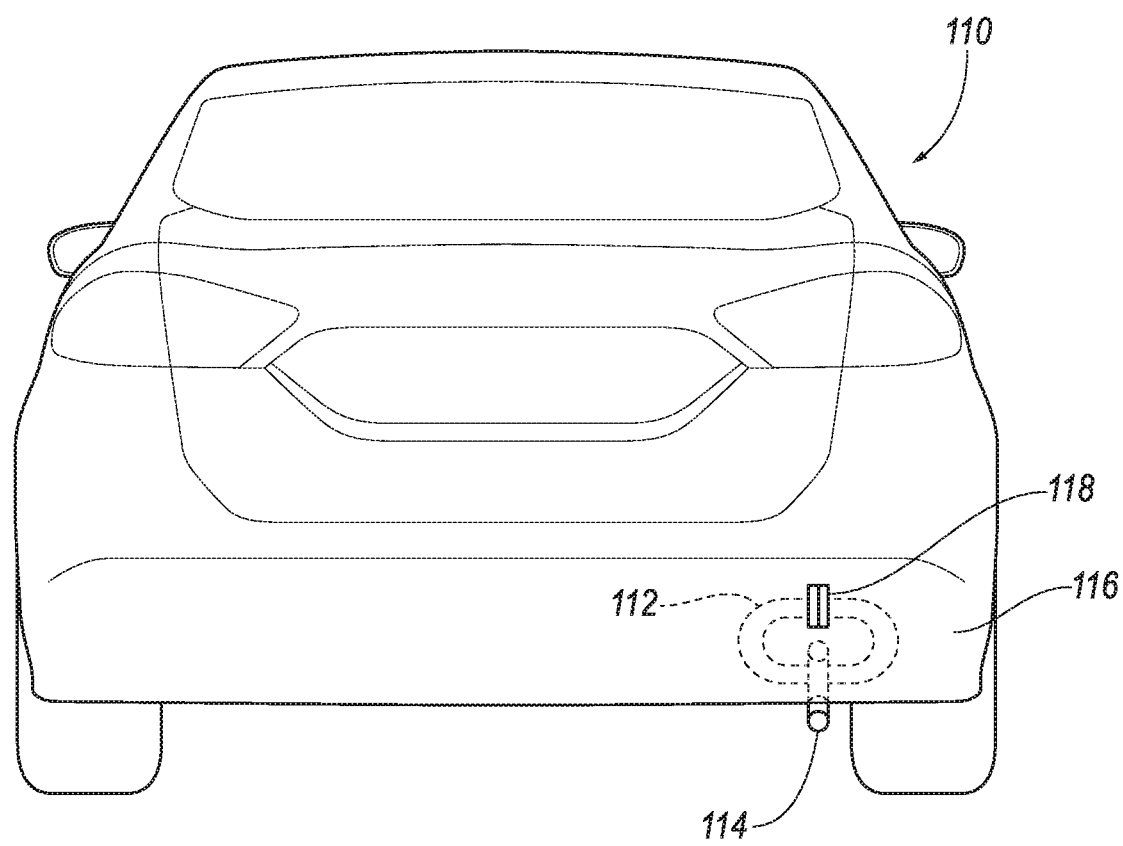
FIG. 1 illustrates a rear elevation view of a vehicle equipped with a longitudinally oriented muffler.

Referring to FIG. 1, a vehicle 110 is shown with a muffler 112 shown in phantom lines. The muffler 112 may port exhaust gases to tailpipes or exhaust pipes 114. The exhaust pipes 114 are shown below the bumper 116 of the vehicle 110. The exhaust pipes 114 may be connected to the vehicle frame via an isolator 118. The muffler 112 in the illustrated embodiment is a longitudinally mounted muffler 112 but it should be understood that the isolator 118 may also be used to attach a transversely oriented muffler to the frame of a vehicle 110. The isolator 118 may also be used to attach any other portions of the exhaust system that require attachment to the vehicle body, frame or other vehicle structure.

Figure 2:
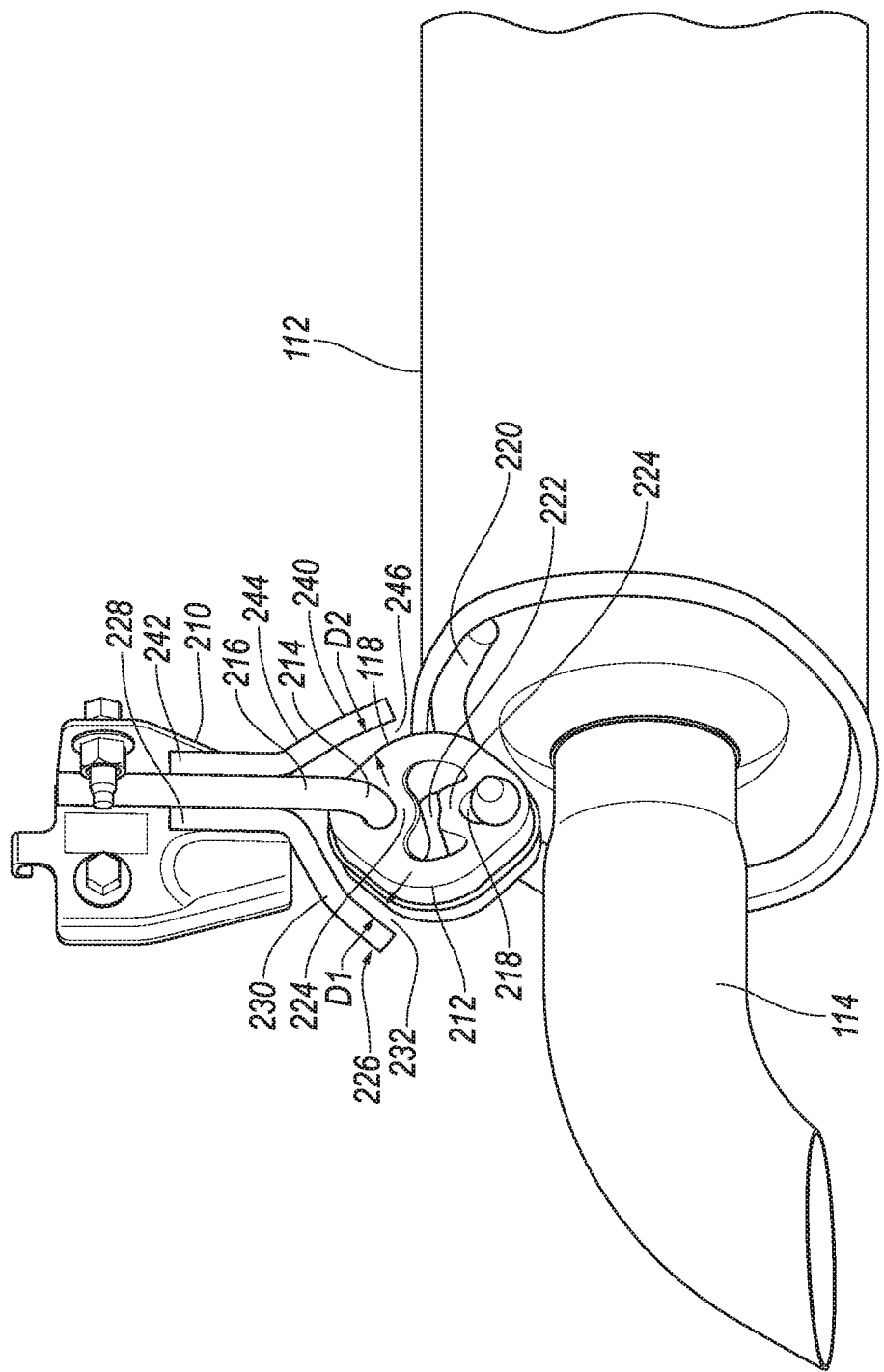
FIG. 2 illustrates a perspective view of an exhaust system attached to a vehicle of one embodiment of the present disclosure.

Referring to FIG. 2, a perspective view of an exhaust system attached to a vehicle of one embodiment of the present disclosure is illustrated. The muffler 112 may be attached to the vehicle frame 210 via the isolator 118. The isolator 118 may include an elastomeric body 212 made of elastomeric material such as natural rubber. The elastomeric body 212 may define a frame pin receiving opening 214 in the upper end configured to accommodate a pin of a frame hanger 216 fixed to the frame 210 of the vehicle 110. As illustrated in FIG. 2, the frame hanger 216 may include a vertical portion welded to the frame 210 of the vehicle 110 and a pin-shaped horizontal portion configured to engage with the frame pin receiving opening 214. The isolator 118 may further define an exhaust pin receiving opening 218 in the lower end configured to accommodate a pin of an exhaust hanger 220 fixed to the muffler 112 and/or the exhaust pipe 114. As illustrated in FIG. 2, the exhaust hanger 220 may have one end fixed to the muffler by welding and another end engaging with the exhaust pin receiving opening 218 to hold the exhaust system in place. Alternatively, the exhaust hanger 220 may include a metal rod (not shown) encircling the exhaust pipe 114 to hold the weight of the exhaust system. The isolator 118 may further include a central opening 222 between the frame pin receiving opening 214 and the exhaust pin receiving opening 218. A pair of vertical joust bumpers 224 (a.k.a. jounce bumpers) are integrally formed to extend toward each other inside the central opening 222. In a severe vertical displacement of the vehicle 110, the elastomeric body 212 may be compressed and the joust bumpers 224 may contact each other while the isolator 118 is stretched and compressed in the area of the central opening 40.

One or more frame brackets may be attached to the frame of the vehicle 110 to limit a longitudinal displacement of the exhaust system. As illustrated in FIG. 2, a first frame bracket 226 may include a fixing portion 228 welded to the vertical portion of the frame hanger 216 and a first engaging portion 230 located at the rear end of isolator 118 configured to engage with the isolator 118 during a displacement. The first engaging portion 230 may be shaped to correspond to the contour of an engaging surface of the isolator 118. A first gap 232 having a predetermined width may be applied between the first engaging portion 230 and the isolator 118 to allow the isolator 118 to rotate clockwise about the pin-shaped horizontal portion of the frame hanger 216 toward the rear end of the vehicle 110 until the isolator 118 touches the first engaging portion 230. The width of the first gap 232 may define a first distance D1 defining an allowable magnitude of displacement of the exhaust system. Although the first engaging portion 230 of the first frame bracket 226 is located in the rear end of the isolator 118, the present disclosure is not limited thereto and the first frame bracket 226 may be further configured to extend through the front end of the isolator 118. In addition, the first frame bracket 226 may be further configured to attach to the frame 210 of the vehicle 112 via other means in addition to or in lieu of the vertical portion 228. Additionally, the vehicle may be provided with a second frame bracket 240 located on the opposite side of the first frame bracket 226. The second frame bracket may include a fixing portion 242 attached to the body of the vehicle and a second engaging portion 244 configured to engage with the isolator 118 during a displacement. A second gap 246 having a predetermined width may be applied between the second engaging portion 244 and the isolator 118 to allow the isolator 118 to rotate counter-clockwise about the pin-shaped horizontal portion of the frame hanger 216 toward the front end of the vehicle 110 until the isolator 118 touches the second engaging portion 244. The width of the second gap 246 may define a second distance D2 defining an allowable magnitude of displacement of the exhaust system.

Figure 3:
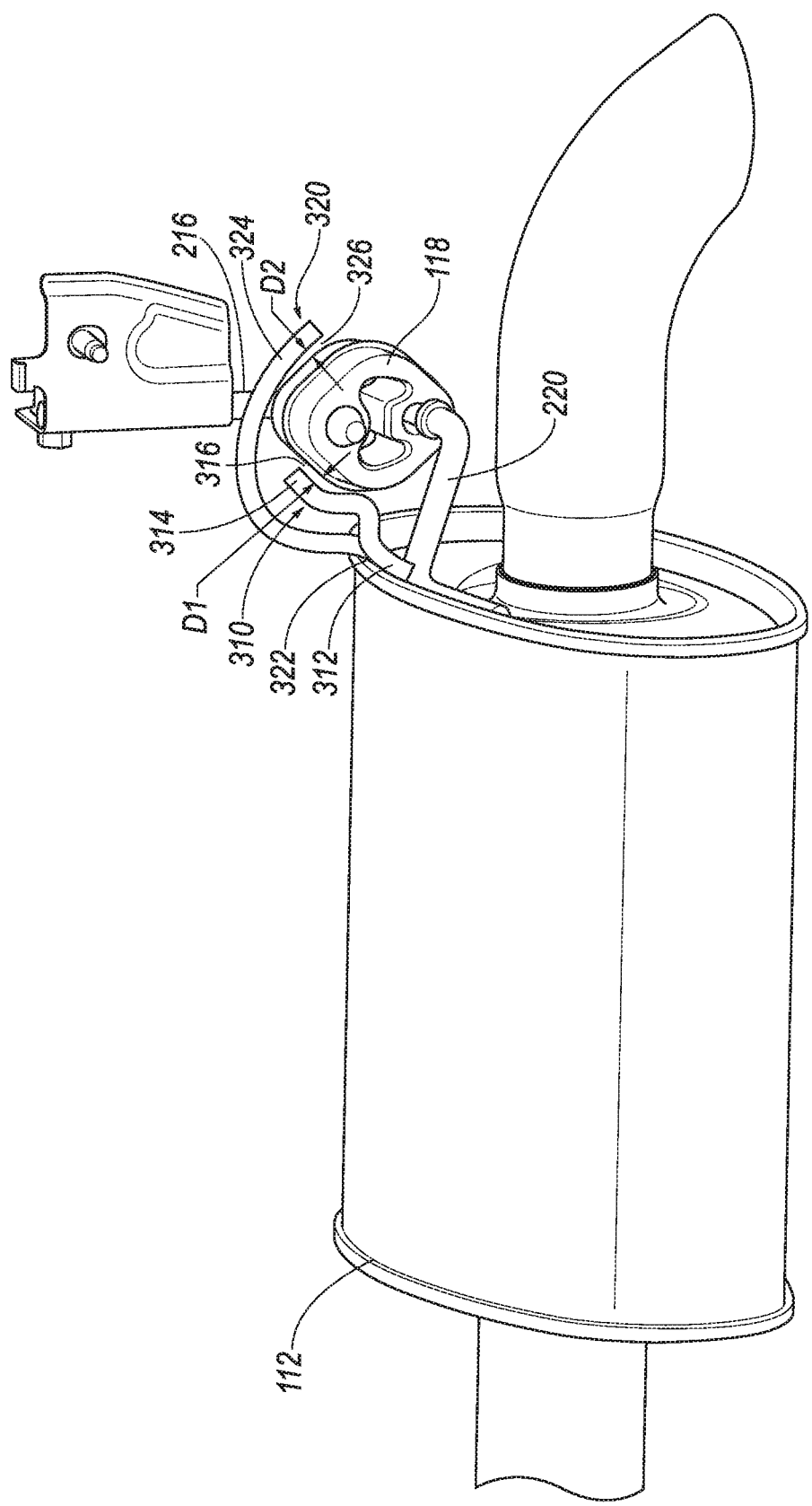
FIG. 3 illustrates a perspective view of an exhaust system attached to a vehicle of another embodiment of the present disclosure.

Referring to FIG. 3, a perspective view of an exhaust system attached to a vehicle of another embodiment of the present disclosure is illustrated. In the present embodiment, one or more exhaust brackets fixed to the exhaust system may be used to limit the longitudinal movement of the isolator 118 in lieu of the frame bracket 226 as illustrated in FIG. 2. The A first exhaust bracket 310 may include a fixing portion 312 welded to the exhaust hanger 220 and/or the muffler 112 and a first engaging portion 314 located at the front end of isolator 118 configured to engage with the isolator 118 during a displacement. The first engaging portion 314 may be shaped to correspond to the contour of an engaging surface of the isolator 118. A gap 316 having a predetermined width may be applied between the first engaging portion 314 and the isolator 118 to allow the isolator 118 to rotate counter-clockwise about the pin-shaped horizontal portion of the frame hanger 216 toward the rear end of the vehicle 110 until the isolator 118 touches the first engaging portion 314. The width of the gap 316 may define a first distance D1 indicative of an allowable magnitude of displacement of the exhaust system. Although the first engaging portion 314 of the first exhaust bracket 310 is located in the front end of the isolator 118, the present disclosure is not limited thereto and the first exhaust bracket 310 may be further configured to extend through the rear end of the isolator 118. A second exhaust bracket 320 may include a fixing portion 322 attached to the muffler 112 and a second engaging portion 324 located at the rear end of isolator 118 configured to engage with the isolator 118 during a displacement. A gap 326 having a predetermined width may be applied between the second engaging portion 324 and the isolator 118 to allow the isolator 118 to rotate clockwise about the pin-shaped horizontal portion of the frame hanger 216 toward the front end of the vehicle 110 until the isolator 118 touches the second engaging portion 324. The width of the gap 326 may define a second distance D2 indicative of an allowable magnitude of displacement of the exhaust system.

Figure 4A:
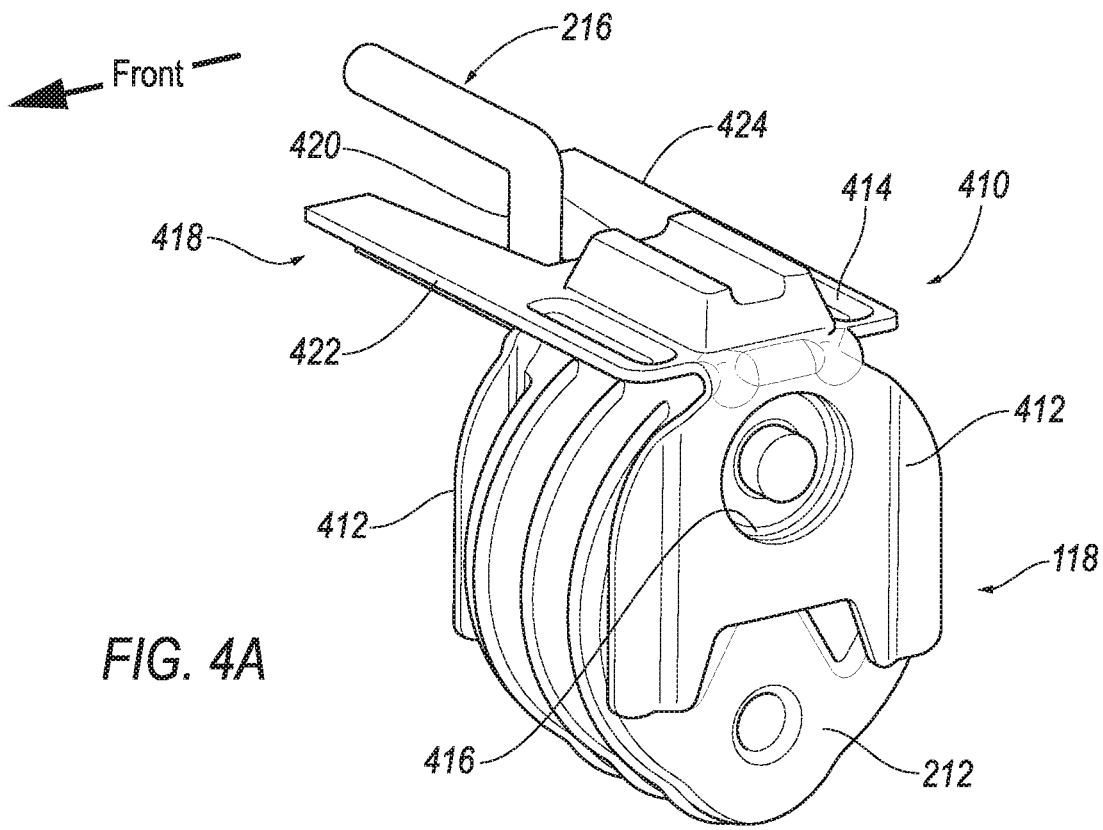
FIGS. 4A and 4B illustrate a perspective view and a top view of an isolator of yet another embodiment of the present disclosure.
Figure 4B:
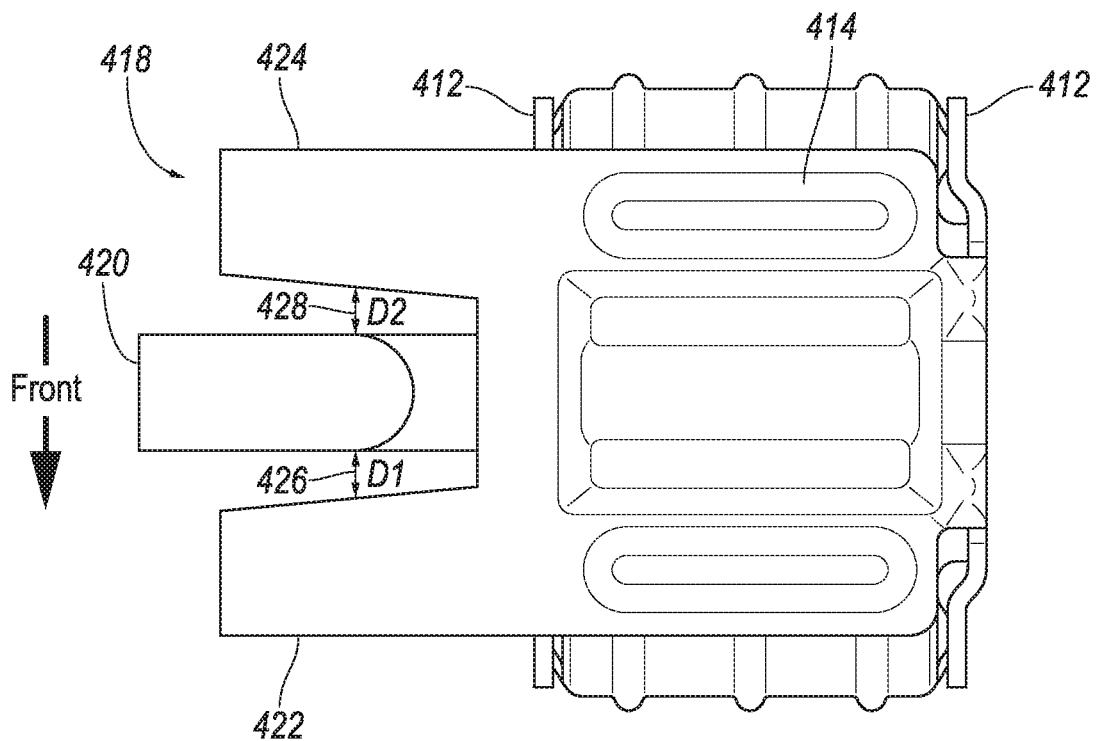

Referring to FIGS. 4A and 4B, a perspective view and a top view of an isolator of yet another embodiment of the present disclosure is illustrated. In the present embodiment, the isolator may include an elastomeric body 212 and a saddle bracket 410. The saddle bracket 410 may include a pair of sidewalls 412 that flank opposite sides of the elastomeric body 212. A bridging wall (top wall) 414 may connect the two sidewalls 412 across the upper end of the body 212. The sidewalls 412 may define access openings 416 corresponding to the frame pin receiving opening 214 of the body 212 to accommodate the pin-shaped horizontal portion of the frame pin 216 when the isolator 118 is installed onto the vehicle 110. The bridging wall 414 may include or connect to an isolator bracket 418 configured to engage with an engaging portion 420 of the frame hanger 216 during an exhaust system displacement. The bracket 418 may include a front bracket 422 configured to engage with the engaging portion 420 of the frame hanger 216 when the exhaust system is displaced toward the front of the vehicle 110 and the isolator rotates clockwise. The bracket 418 may further include a rear bracket 424 configured to engage with the engaging portion 420 of the frame hanger 216 when the exhaust system is displaced toward the rear of the vehicle 110 and the isolator rotates counter-clockwise. The front bracket 422 may be configured to have a first distance D1 to leave a front gap 426 between the front bracket 422 and the engaging portion 420 of the frame hanger 216 when the isolator is installed onto the vehicle 110 with no exhaust system displacement. The rear bracket 424 may be configured to have a width second distance D2 to leave a rear gap 428 between the rear bracket 424 and the engaging portion 420 of the frame hanger 216 when the isolator is installed onto the vehicle 110 with no exhaust system displacement. The front gap 426 may define an allowable magnitude of displacement of the exhaust system toward the front of the vehicle 110 and the rear gap 428 may define an allowable magnitude of displacement of the exhaust system toward the rear of the vehicle 110. In one embodiment, the front gap 426 and the rear gap 428 may be the same, whereas in another embodiment, the front gap 426 and the rear gap 428 may be different.

While exemplary embodiments are described above, it is not intended that these embodiments describe all possible forms encompassed by the claims. The words used in the specification are words of description rather than limitation, and it is understood that various changes may be made without departing from the spirit and scope of the disclosure.

As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A vehicle comprising:
    an exhaust;
    a frame hanger connected to a body of the vehicle;
    an isolator connecting the exhaust to a body of the vehicle via the frame hanger such that the exhaust rotates about the frame hanger;
    a first frame bracket having a fixing portion fixed to the body of the vehicle and an engaging portion configured to engage with a first outer surface of the isolator, wherein the first bracket is located adjacent to the isolator at a first distance that defines a first maximum allowable displacement of the exhaust as it rotates in a first direction about the frame hanger; and
    a second frame bracket having an engaging portion configured go engage a second outer surface of the isolator opposite to the first outer surface, wherein the second frame bracket is located adjacent to the isolator at a second distance opposite to the first frame bracket, wherein the second distance defines a second maximum allowable displacement of the exhaust as it rotates in a second direction about the frame hanger.

2. The vehicle of claim 1, wherein the first and second distances are equal.

3. The vehicle of claim 1, wherein the first and second distances are different.

4. The vehicle of claim 1, wherein the engaging portion of the first frame bracket has a shape that is complementary to a portion of the isolator.

5. An exhaust system connected to a mount of a vehicle via an isolator, comprising:
    a muffler;
    an exhaust pipe connected to the muffler;
    a first exhaust bracket having a fixing portion attached to the muffler or the exhaust pipe, and an engaging portion having a shape complementary to a shape of the isolator and configured to engage with an outer surface of the isolator to limit a travel of the exhaust system relative to the mount, wherein the engaging portion is located adjacent to the isolator at a first distance defining a maximum allowable displacement when the exhaust travels in a first direction; and
    a second exhaust bracket having a fixing portion attached to the muffler, and an engaging portion configured to engage with the outer surface of the isolator opposite to the engaging portion of the first exhaust bracket.

6. The exhaust system of claim 5, wherein the engaging portion of the second exhaust bracket is located adjacent to the isolator at a second distance defining a maximum allowable displacement when the exhaust travels in a second direction.

7. The exhaust system of claim 6, wherein the first distance is the same as the second distance.

8. The exhaust system of claim 6, wherein the first distance is different from the second distance.

9. The exhaust system of claim 5 further including a second exhaust bracket having a fixing portion attached to the exhaust pipe, and an engaging portion configured to engage with the outer surface of the isolator opposite to the engaging portion of the first exhaust bracket.

10. The exhaust system of claim 9, wherein the engaging portion of the second exhaust bracket is located adjacent to the isolator at a second distance defining a maximum allowable displacement when the exhaust travels in a second direction.

11. The exhaust system of claim 10, wherein the first distance is the same as the second distance.

12. The exhaust system of claim 10, wherein the first distance is different from the second distance.

13. An isolator for connecting an exhaust system to a mount of a vehicle, comprising:
    an elastomeric body configured to connect to a frame hanger of the vehicle; and
    a saddle bracket having two side walls, a bridging wall connecting the two side walls, and an isolator bracket extending from the bridging wall and configured to engage with the frame hanger when the exhaust system is displaced to limit a travel of the exhaust system relative to the frame hanger,
    wherein the isolator bracket includes a first pin located on a first side of the frame hanger at a first distance defining a first maximum allowable displacement when the exhaust system is displaced in a first direction, and a second pin located on a second side of the frame hanger opposite to the first side at a second distance defining a second maximum allowable displacement when the exhaust system is displaced in a second direction opposite to the first direction.

14. The isolator of claim 13, wherein the first and second distances are equal.

15. The isolator of claim 14, wherein the first and second distances are different.

* * * * *